(12) United States Patent
Campagna

(10) Patent No.: US 12,287,386 B2
(45) Date of Patent: Apr. 29, 2025

(54) METHOD, SYSTEM AND COMPUTER PROGRAM FOR STORING MR IMPLANT INFORMATION DATA AND FOR STORING MR DEVICE DATA AND MACHINE-READABLE STORAGE MEDIUM

(71) Applicant: Siemens Healthineers AG, Forchheim (DE)

(72) Inventor: Swen Campagna, Engelthal (DE)

(73) Assignee: SIEMENS HEALTHINEERS AG, Forchheim (DE)

( * ) Notice: Subject to any disclaimer, the term of this patent is extended or adjusted under 35 U.S.C. 154(b) by 154 days.

(21) Appl. No.: 18/169,350

(22) Filed: Feb. 15, 2023

(65) Prior Publication Data
US 2023/0258753 A1    Aug. 17, 2023

(30) Foreign Application Priority Data
Feb. 17, 2022    (DE) .................... 10 2022 201 678.5

(51) Int. Cl.
*G01R 33/56*    (2006.01)
*H04L 9/00*    (2022.01)
*H04L 9/06*    (2006.01)

(52) U.S. Cl.
CPC ........ *G01R 33/5608* (2013.01); *H04L 9/0643* (2013.01); *H04L 9/50* (2022.05)

(58) Field of Classification Search
CPC ..... G01R 33/5608; H04L 9/0643; H04L 9/50; H04L 63/123; H04L 2209/88
See application file for complete search history.

(56) References Cited

U.S. PATENT DOCUMENTS

| | | |
|---|---|---|
| 2017/0212913 A1 | 7/2017 | Kurse |
| 2018/0304087 A1 | 10/2018 | Gadagkar et al. |
| 2020/0160947 A1 | 5/2020 | Rasovsky et al. |
| 2021/0068699 A1 | 3/2021 | Liu et al. |
| 2022/0051767 A1* | 2/2022 | Tikka ..................... G16H 70/20 |

FOREIGN PATENT DOCUMENTS

| | | |
|---|---|---|
| JP | 6647999 B2 | 2/2020 |
| KR | 20210025411 A | 3/2021 |

OTHER PUBLICATIONS

Norme Internationale IEC 60601-2-33,; 2010.

* cited by examiner

*Primary Examiner* — G. M. A Hyder
(74) *Attorney, Agent, or Firm* — Harness, Dickey & Pierce, P.L.C.

(57) ABSTRACT

A method for storing MR implant information data, comprises: receiving a request for storing MR implant information data for an implant; determining a hash for the MR implant information data; generating a block for a blockchain, wherein the block includes the hash and a reference to a previous block in the blockchain; storing the MR implant information data in a memory; and registering the block in the blockchain.

15 Claims, 4 Drawing Sheets

METHOD, SYSTEM AND COMPUTER PROGRAM FOR STORING MR IMPLANT INFORMATION DATA AND FOR STORING MR DEVICE DATA AND MACHINE-READABLE STORAGE MEDIUM

CROSS-REFERENCE TO RELATED APPLICATION(S)

The present application claims priority under 35 U.S.C. § 119 to German Patent Application No. 10 2022 201 678.5, filed Feb. 17, 2022, the entire contents of which are incorporated herein by reference.

FIELD

One or more example embodiments of the present invention relate to a method, a system and a computer program for storing MR implant information data. The subject matter of one or more example embodiments of the present invention further include a method, a system and a computer program for storing MR device information. one or more example embodiments of the present invention further describe a machine-readable storage medium with at least one of the computer programs.

BACKGROUND

Imaging by magnetic resonance (MR), also called magnetic resonance imaging (MRI) is a particularly advantageous method in medical technology. MRI is characterized by high soft tissue contrast. For this purpose, an MR scan, scan for short, of the object under examination, for example a human or veterinary patient, is performed using an MR apparatus. For this purpose, the object under examination is positioned in an examination room of the MR apparatus. During an MR scan, radio-frequency (RF) transmission pulses are usually radiated into the object under examination with the aid of a transmit coil arrangement of the MR apparatus. Further, gradient pulses are output with the aid of a gradient coil unit of the MR apparatus, as result of which temporary magnetic field gradients are generated in the examination room. The generated pulses excite and release spatially encoded MR signals in the patient. The MR signals are received by the MR apparatus and used to reconstruct MR images.

The gradient fields can cause peripheral nerve stimulation (PNS) and the radio-frequency fields can cause heating. Therefore, standardization bodies, such as, for example, IEC 60601-2-33, require these PNS and/or heating effects to be monitored and limited. In the past, patients with implants were generally excluded from magnetic resonance examinations. The development of new conditionally MR-compatible implants, which can be characterized according to IEC 60601-2-33 with "Fixed Parameter Option: Basic" (FPO:B), enables magnetic resonance examinations to be permitted in implant wearers, if certain conditions are met.

Typical conditionally MR-compatible implants can, for example, be pacemakers, defibrillators and other implants, such as those used for drug delivery or deep brain stimulation or spinal stimulation. When examining a person wearing such an implant according to IEC 60601-2-33, it should be ensured that the magnetic resonance apparatus is operated in a safe operating mode in order not to endanger the health of the implant wearer. Usually, the safe operating mode imposes a limitation on the performance of the magnetic resonance apparatus and so the safe operating mode can also be referred to as a restricted operating mode. For example, according to IEC 60601-2-33, in particular an RMS B1+value B1+rms, a maximum B1+value B1+peak, an amount of an RMS rate of change of a B value (|dB/dt|rms) FPO and an amount of a maximum rate of change (|dB/dt|peak)FPO should not be exceeded.

Therefore, for scanning patients with implants in an MR apparatus, it is necessary to know the corresponding limitations (regarding RF power, static and dynamic magnetic fields) of the implant and to take them into account accordingly and to assess whether and, if so, in which MR apparatus the patient with a specific implant of this kind can be examined.

To date, in practice, this has been a laborious, error-prone, and possibly even inconclusive, process for the responsible radiologist or MR physicist. Even if a patient brings along an implant card in which the data ascertained at the time of creation are recorded, this data can already be out of date. Without this data, or without up-to-date data, a search is typically made for publicly accessible data sheets that contain the desired details. The validity and trustworthiness of data obtained in this way must be viewed critically. There are no trustworthy and up-to-date well-maintained and cross-manufacturer databases and this makes planning and setting device and recording parameters and actually scanning people with implants via an MR apparatus a time-consuming and high-risk task.

SUMMARY

One or more example embodiments of the present invention are based on an object of improving the safety of implant wearers during an MR scan or the recording of MR data for the implant wearer. For at least this purpose, one or more example embodiments of the present invention describe methods that make it possible to implement a trustworthy, tamper-proof and well-maintained or cross-manufacturer database of MR-relevant data for implants and MR apparatuses.

The object is achieved by the features of the independent claims. Advantageous embodiments are described in the subclaims.

According to one aspect of an embodiment of the present invention, a method for storing MR implant information data is proposed. The method is in particular a computer-implemented method. The method is specifically used for decentralized storage of MR implant information data. The storage of the MR implant information data takes place based on and/or using a blockchain. The MR implant information data is in particular data relating to an implant, a type of implant, an implant manufacturer or an implant wearer. Preferably, MR implant information data is or will be stored for each implant, type of implant, implant manufacturer or implant wearer. The MR implant information data comprises, for example, operating variables and/or limit values for the relevant implant and/or implant wearer that must be observed during an MR scan. Preferably, the MR implant information data is provided by a manufacturer, a certification body or a trusted authority. The method provides for the reception of a request for storing MR implant information data. The request is preferably a manufacturer request, a certification body request or a request from the trusted authority. Specifically, the method provides that requests to store the MR implant information data for further execution of the method and/or for the application of the method are to originate from a prespecified and/or prespecifiable user group, wherein the user group preferably comprises authorized users, manufacturers of implants or MR apparatuses, certification bodies and/or trusted authorities. According to one embodiment, it is, for example, checked whether the request originates from the user group, wherein only requests from the user group are further processed according to an embodiment of the present invention.

The MR implant information data is processed and a hash is determined for the MR implant information data. The hash is in particular determined based on the MR implant information data, preferably based on the content of the MR implant information data. Hereinafter, the term "hash" refers to a bitstring, an output sequence obtained by the action of a cryptographic hash function on a file, specifically on the MR implant information data, corresponding to a first bitstring as an input string. Herein, the terms "hash function" and "hash algorithm" are equivalent. To be significant, this hash function must convert the long first bitstring into a shorter bitstring. In addition, for the hash to be a useful form of a unique "fingerprint" of the document, the likelihood of the hash already existing as the hash of another file, for example MR implant information data for another implant, must be very low. This "fingerprint" is usually referred to by the term "message digest". It should also be impossible to reconstruct parts of the original document from the hash obtained, i.e., the hash function should be "one-way" or irreversible. Hence, in a preferred embodiment, the cryptographic hash function is a function that meets all of these criteria, such as, for example, an algorithm belonging to the Secure Hash Algorithm (SHA) family, such as, for example, SHA-256.

Based on the hash and in particular based on the MR implant information data, a block for a block chain is generated. The block to be generated comprises the block that is ascertained and a reference to a previous block in the blockchain.

The term "blockchain" should in particular be understood to be a distributed database that maintains an ever-growing list of registrations in blocks that can be incontestably specified, kept up-to-date and cannot be adapted.

Herein, it is irrelevant which variant of the blockchain is meant, and all distributed ledger technologies (DLT) can be used as a blockchain for embodiments of the present invention. In addition, the present invention is independent with respect to the specific blockchain used and can be applied to all types of blockchain without requiring any change. In a preferred embodiment, it is possible to use a plurality of blockchain types simultaneously, for example with a system that has access to a plurality of blockchains and registers a file A in blockchain A for user A, while a file B in blockchain B is registered for user B. Accordingly, the terms "blockchain" and "distributed ledger technology" are used synonymously in this document. A consensus mechanism involved in adding data to the blockchain is preferably distributed consensus. This can include Proof-of-Work, but can also and/or alternatively comprise one of the following: Proof-of-Stake, a leader-based system, a voting-based system or a hashgraph-based principle.

In a preferred embodiment, without restricting the scope of the present invention, as distributed ledger technology, the blockchain meets the following conditions, wherein here specifically records and data sets are to be understood as blocks:
the records can be replicated across multiple nodes in a network (decentralized environment).
new data sets can be added from any node if consensus is achieved from other nodes.
existing records can be validated for integrity, authenticity and indisputability.
existing data sets cannot be removed and their order cannot be changed.
the different nodes can act as independent participants that do not necessarily have to trust each other.

The block generated for the MR implant information data is registered in the blockchain, or, in other words, the block generated is stored in the blockchain. The MR implant information data is stored in a memory, in particular stored in a decentralized memory. The memory for storing the MR implant information data is preferably a cloud-based memory or a distributed memory. Specifically, the memory is part of the distributed systems, or system network, for registering and/or storing the blocks in the blockchain. Optionally, the MR implant information data itself is stored and/or registered in the blockchain or the system network of the blockchain. If the MR implant information data is not explicitly stored in the blockchain, but only in the memory that is not participating in the blockchain, it is particularly preferable for a file reference to be generated for the MR implant information data based on the hash, wherein the file reference is registered in the blockchain. This embodiment means that only identifiers of the document, i.e., the MR implant information data, need to be stored in the blockchain and the actual or complete content of the document does not need to be stored in the blockchain. However, the complete content of the document, which is not stored as such in the blockchain, can be verified based on the blocks registered in the blockchain, in particular the blocks for the MR implant information data and for the file reference.

Hence, embodiments of the present invention enable secure, verifiable and unalterable storage of MR implant information data that can be used as a database when planning an MR scan for an implant wearer. In particular, the method is characterized by a particularly efficient use of system resources such as memory, blockchain storage, processor power, etc. The method enables the establishment and provision of a trustworthy, always up-to-date and complete database for MR implant information data, which previously did not exist or was not up-to-date and/or not trustworthy enough to ensure the health of a person was not endangered by an MR scan.

According to one embodiment of the present invention, the MR implant information data is encrypted, wherein the encrypted MR implant information data is stored in the memory or in the blockchain. In particular, a key is required to access, read and/or open the encrypted MR implant information data. For example, the MR implant information data comprises confidential and/or personal data that should not be disclosed to third parties, unauthorized people and/or competitors. Such data is correspondingly protected by being encrypted, registered in the blockchain and stored in the memory. The key can be held in the MR apparatus or obtained therefrom, wherein, when the key is obtained by the MR apparatus, verification of the MR apparatus is preferably provided by the key provider.

The MR implant information data optionally comprises a user identity for verification. The user identity is or comprises, for example, manufacturer's details, a reference to the certification authority, a reference to the trustworthy body, personal details and/or a key or details of a key reference source. Further, the MR implant information data can comprise a time stamp, for example to indicate the time of creation of the MR implant information data and/or the time of storage of the MR implant information data.

According to one embodiment of the present invention, the method provides assigning the MR implant information data to syllabus data. Alternatively and/or supplementarily, the syllabus data is generated and/or ascertained based on the MR implant information data. The syllabus data has, for example, a uniform representation of data and/or the data comprised by the syllabus data is arranged according to a prespecified and/or adjustable structure. Specifically, the syllabus data is a summary of the MR implant information data. For example, a subset of information and data is extracted from the MR implant information data, for example the most needed, the most frequently searched for, and/or the most unique data and/or information. Preferably, the data and/or information extracted from the MR implant information data is summarized and provided as the syllabus data. Specifically, the syllabus data is semantic data and/or has semantics. Preferably, the file reference is created taking into account the syllabus data. The syllabus data is in each case related to an implant, in particular to the implant of the associated MR implant information data. The syllabus data is stored in the memory and/or in the blockchain.

To search for MR implant information data for an implant, request data is received. The search is, for example, performed when a person entrusted with planning an MR scan for an implant wearer searches for MR-relevant data for the implant wearer's implant. For this purpose, the entrusted person can generate and/or provide corresponding request data. The request data comprises, for example, data and/or information known about the implant, for example from the patient's file. The request data comprises at least one item of implant information, for example in the form of or relating to a subset of data and/or information from the MR implant information data. Preferably, the request data, the implant information and/or the syllabus data comprises a name of the implant, an ID of the implant, a serial number of the implant, a product number of the implant, a manufacturer of the implant and/or information about the type, function and/or characteristic properties of the implant. Based on the received request data, the request data is checked for conformity with syllabus data. In particular, a measure of conformity is determined in each case for the stored syllabus data and/or syllabus data registered in the blockchain, wherein the measure of conformity describes the degree of conformity of the request data with the syllabus data. The measure of conformity is preferably a percentage quantity, wherein a measure of conformity of 100% describes complete conformity of the request data with the syllabus data and a measure of conformity of 0% describes a complete discrepancy between request data and the syllabus data. Preferably, the syllabus data with which the request data have the greatest measure of conformity is ascertained. The MR implant information data assigned to the syllabus data is determined for the syllabus data with conformity with the request data and/or for the syllabus data with the greatest measure of conformity. Conformity is in particular assumed if the measure of conformity exceeds a prespecified and/or adjustable threshold value. The identified MR implant information data is provided, for example displayed or output, as data. Hence, the output and/or the provision in particular takes place as a reaction and/or response to the request with the request data.

The MR implant information data, specifically the syllabus data, in particular comprises parameters and/or limit values, that must be observed for an implant wearer during an MR scan. For example, the parameters and/or limit values relate to variables and/or parameters that must be observed according to IEC 60601-2-33 and/or have an impact on the implant wearer's safety. The MR implant information data, specifically the syllabus data, comprises, for example a maximum RF power, a maximum gradient power, a permissible RMS magnetic field (for example B1+rms) and/or a permissible maximum magnetic field (for example B1+peak), a permissible temporal change of a magnetic field in a magnetic resonance apparatus for examining the implant.

A further aspect of an embodiment of the present invention is a system for storing MR implant information data, in particular by applying the method for storing MR implant information data, according to an embodiment of the present invention. The system comprises a plurality of interconnected apparatuses, wherein each of the apparatuses comprises a processor, a non-volatile apparatus memory, instructions on the apparatus memory for controlling the processor, a client application, wherein for each apparatus the client application is configured to execute the method for storing MR implant information data, according to an embodiment of the present invention. Specifically, the system comprises the blockchain and/or the memory for storing the MR implant information data.

Each of the apparatuses comprised by the system can in particular be understood to be implemented as a combination of software and hardware. For example, each of the apparatuses can be implemented using the processor that executes instructions stored in a memory for applying the method for storing the MR implant information data. The apparatuses are, for example, embodied as a computer, specifically a personal computer, a laptop computer, a central server, a cloud, a cell phone, a camera phone, a smartphone, a personal digital assistant, a media player, a navigation device, an email receiving and sending device, a games console, a tablet computer, a portable device or any combination of these devices.

A further subject matter of an embodiment of the present invention is a computer program for executing the, in particular computer-implemented, method for storing MR implant information data. The computer program comprises computer-readable program code sections, wherein the program code sections comprise instructions for executing the method. The computer program, in particular as a computer program, is for execution and/or application on a computer, in particular for application by the system, according to an embodiment of the present invention, comprising the apparatuses.

A further subject matter of an embodiment of the present invention is a method for storing MR device data. The method for storing MR device data is in particular analogous to and/or adapted to the method for storing MR implant information data, wherein the difference between the two methods should in particular be evident with respect to the data to be stored (MR device data/MR implant information data). The method is in particular a computer-implemented method. The method is specifically used for decentralized storage of the MR device data. The storage of the MR device data takes place based on and/or using a blockchain. The MR device data is in particular data relating to an MR device, wherein the MR apparatus is an apparatus for recording MR data for an object under examination. The MR device data is, for example, data for an MR apparatus relating to a type of device, series, manufacturer or an internal identifier. The MR device data in particular comprises parameters, settings, applications, characteristics and/or authorizations that can be applied by the MR apparatus, such as, for example, whether there is authorization and/or suitability according to IEC 60601-2-33. Further, the MR device data can, for example, comprise RF powers, gradient powers, B1 values and temporal changes of the gradient field that can be used by the device. The MR device data in particular comprises all relevant data that can be selected during an MR scan, is to be checked and/or is relevant for scanning implant wearers. Preferably, the MR devices of a manufacturer, certification body or another trusted authority are provided. The method provides for receiving a request for storing the MR device data. The request is preferably a manufacturer request, a certification body request or a request from the trusted authority. Specifically, the method provides that requests for storing the MR device data of authorized, in particular certified, users are to be received, wherein according to one embodiment it is, for example, checked whether the request originates from an authorized and/or certified user, wherein the method only further processes requests from authorized and/or certified users.

The MR device data is further processed, wherein a hash is determined for the MR device data. In the context of this method, the term "hash" should again be understood in the same way as already explained regarding the "hash" in the method for storing MR implant information data. A block for a block chain is generated based on the hash of the MR device data. The block to be generated comprises a reference to a previous block in the blockchain. The blockchain for registering the blocks relating to the MR device data can be identical to the blockchain for storing the MR implant information data. Alternatively, there are two different and/or independent blockchains. In the context of the method for storing MR device data, the term "blockchain" should again be understood in the same way as already explained for the method for storing MR implant information data.

The block generated for the MR device data is registered in the blockchain, or, in other words, the generated block is stored in the blockchain. The MR device data is stored in a memory that is identical to or different from the memory for MR implant information data, in particular the MR device data storage is decentralized. Specifically, the MR device data is stored in the blockchain. If the MR device data is not stored in the blockchain, but in a memory, it is particularly preferable for the MR device data to generate a file reference based on the hash, wherein the file reference is registered in the blockchain. This, for example, enables only identifiers of the document, i.e., the MR device data, and not the actual content to be stored in the blockchain. The content of the stored MR device data can be verified based on the file reference.

One or more example embodiments of the present invention enable secure, verifiable and unalterable storage of MR device data. Hence, the method enables the provision of a trustworthy, up-to-date and complete database for planning, parametrizing and performing MR scans on people with implants.

The MR device data of an MR apparatus in particular comprises the variables, parameters and/or limit values that can be adjusted by the MR apparatus. Specifically, the MR device data comprises a configuration parameter data set that can be used to check observance of implant-compliant limit values. The configuration parameter data set can be used to configure the MR apparatus with system-specific parameters so that the MR apparatus can use measurement data to ascertain correct safety-relevant variables that ensure observance of the limit values. The configuration parameter data set comprises, for example, parameters such as gradient coil sensitivity and/or a conversion factor that can be used to calculate a B1+ value from a voltage value and/or a rate of change of a magnetic field dB/dt from a current value. These parameters usually differ according to the design of the radio-frequency antenna unit and/or the gradient coil unit. In particular, the configuration parameter data set can be based on a worst-case scenario. This is in particular advantageous since any components of the magnetic resonance apparatuses, such as, for example, the radio-frequency antenna unit and/or the gradient coil unit, are often not equipped with hardware identification and are therefore generally configured via software during installation and/or commissioning of the magnetic resonance apparatus.

Preferably, the configuration parameter data set can be verified using a checksum. The checksum can comprise a target checksum that can be formed based on a target device ID and the configuration parameter set. Herein, preferably, the target device ID is embodied to uniquely identify a type of magnetic resonance apparatus and/or relevant components of a magnetic resonance apparatus. The target device ID is preferably inseparably linked to a type of magnetic resonance apparatus and/or relevant components and/or can be ascertained independently. The configuration parameter data set and/or the target checksum and/or the target device ID can be used to generate a self-contained data set.

One embodiment of the present invention provides for receiving device pool data from a pool operator. The device pool data comprises information about existing and/or available MR apparatuses. For example, the device pool data is specific to a facility, for example an examination center, a practice or hospital. Herein, the device pool data comprises the MR apparatuses present in the facility and/or the apparatuses accessible to the facility, for example from cooperating facilities. The MR device data is assigned to the device pool data. In other words, in this way, all the MR device data relating to the facility's device pool are available and/or assigned for the device pool. Scan request data is received to check whether a person and/or an implant wearer can be scanned via one of the MR devices in the device pool. The scan request data comprises at least one item of partial information of the MR device data. For example, the scan request data comprises parameters and/or settings to be observed for an MR scan. In particular, the scan request data is determined based on the MR implant information data, for example, for a person with an implant to be examined, the MR implant information data associated with the implant is applied as scan request data. Then, it is checked whether there is conformity between the scan request data and the device pool data. The determination of conformity is in particular embodied like the determination of conformity between the request data and syllabus data. In particular, the determination of conformity between scan request data and device pool data is based on a determination of a measure of conformity. Preferably, in each case a measure of conformity is determined based on the device pool data for the MR device data assigned to the device pool data and the scan request data. In particular, in this way it is determined which MR apparatus can observe and/or adjust the variables and/or limit values defined in the MR implant information data. In response to the determination of conformity, the MR device data with conformity, or with the greatest conformity, is identified. This makes it possible to determine and select from the device pool the MR apparatus that is suitable, in particular most suitable, for an MR scan taking account of the scan request data. The identified MR device data, specifically the identified MR apparatus, is provided, for example, output as data and/or displayed.

Optionally, reception of MR implant information data registered in a memory and/or blockchain is provided. The MR implant information data is in particular generated and/or stored according to the method for storing MR implant information data, according to an embodiment of the present invention. For example, a user, specifically a medical physicist, wishes to check whether an implant wearer can be scanned with one of the MR apparatuses available in the device pool and/or with which MR apparatus. For this purpose, the request data is accessed, as described for the method for storing the MR implant information data, wherein the MR implant information data identified in this way is used and/or provided for the application of this method embodiment. The scan request data is determined based on the MR implant information data provided, wherein the scan request data comprises MR apparatuses, limit values, boundaries and/or permissible parameters for MR scans authorized for scanning the implant or implant wearer. The MR implant information data, in particular the associated MR apparatus, is identified and provided based on the scan request data determined in this way.

A further subject matter of an embodiment of the present invention is a system for storing MR device data. In particular, the method for storing the MR device data is implemented by the system. The system comprises a plurality of interconnected apparatuses, wherein each of the apparatuses comprises a processor, a non-volatile apparatus memory, instructions on the apparatus memory for controlling the processor, a client application, wherein, for each apparatus, the client application is configured to execute the method for storing the MR device data. In particular, the system and/or the components comprised by the system (apparatuses, processor, apparatus memory) are embodied as described for the system for storing MR implant information data.

Further, one or more example embodiments of the present invention relate to a computer program, in particular a computer program, for executing the method for storing MR device data. The computer program comprises computer-readable program code sections, wherein the program code sections comprise instructions for executing the method.

A further subject matter of an embodiment of the present invention is a machine-readable storage medium, wherein the computer program for storing MR implant information data and/or the computer program for storing MR device data is stored on the storage medium.

BRIEF DESCRIPTION OF THE DRAWINGS

Further advantages, effects and embodiments will be derived from the attached figures and the description thereof. Herein, the figures show.

Figure 1:
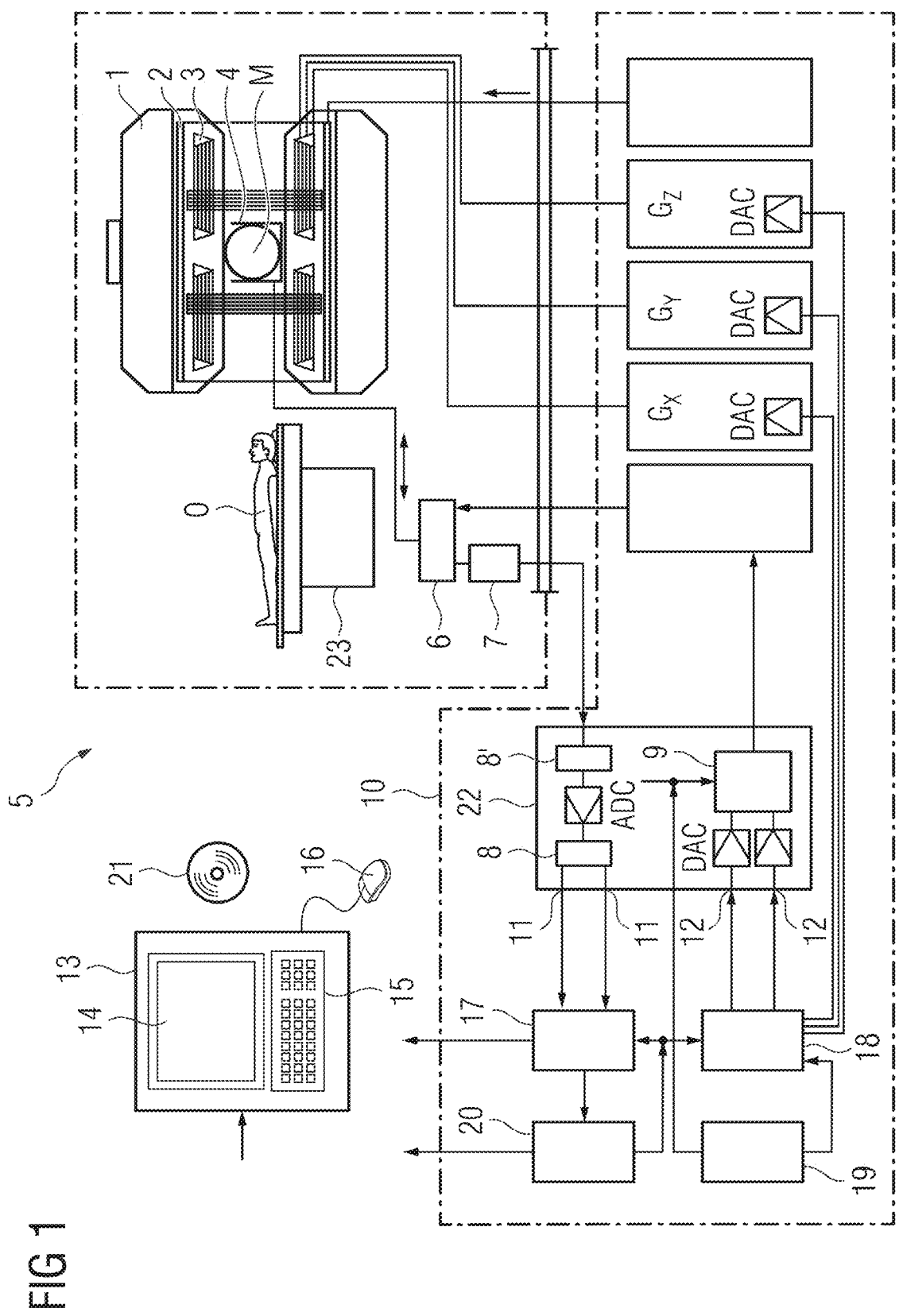
FIG. 1 a schematic representation of an MR apparatus.

The attached drawings are intended to provide better understanding of the embodiments of the present invention. They illustrate embodiments and, in conjunction with the description, help to explain principles and concepts of embodiments of the present invention. Other embodiments and many of the advantages mentioned will become apparent with reference to the drawings. The elements in the drawings are not necessarily shown to scale.

Unless otherwise indicated, in the drawings, elements, features and components that are functionally equivalent and can be operated in an identical manner are provided with similar reference characters.

DETAILED DESCRIPTION

FIG. 1 is a schematic representation of an MR apparatus 5, wherein the MR apparatus 5 is an apparatus for magnetic resonance imaging, often also called a magnetic resonance imaging device. Herein, a basic field magnet 1 generates a temporally constant strong magnetic field for polarization or alignment of the nuclear spins in an examination region of an object O, such as, for example, part of a human body to be examined, which is examined lying on a table 23 in the MR apparatus 5. The object O to be examined can be an implant wearer, for example a person with a pacemaker 30 in the body. The high homogeneity of the basic magnetic field required for the magnetic resonance scan is defined in a typically spherical measurement volume M in which the volume section of the human body to be examined is arranged. To support the homogeneity requirements and in particular to eliminate temporally invariable influences, so-called shim plates made of ferromagnetic material are attached at a suitable point. Temporally variable influences are eliminated by shim coils 2.

A cylindrical gradient field system or gradient field system 3 composed of three sub-windings is inserted in the basic field magnet 1. Each sub-winding is supplied with current by an amplifier to generate a linear (also temporally alterable) gradient field in the respective direction of the Cartesian coordinate system. Herein, the first sub-winding of the gradient field system 3 generates a gradient Gx in the x-direction, the second sub-winding generates a gradient Gy in the y-direction and the third sub-winding generates a gradient Gz in the z-direction. The amplifier comprises a digital-to-analog converter, which is actuated by a sequence controller 18 for time-accurate generation of gradient pulses.

Located within the gradient field system 3, there is one (or more) radio-frequency antennas 4, which convert the radio-frequency pulses emitted by a radio-frequency power amplifier into an alternating magnetic field for excitation of the nuclei and alignment of the nuclear spins of the object O to be examined or of the region of the object O to be examined. Each radio-frequency antenna 4 is composed of one or more RF transmit coils and one or more RF receive coils in the form of an annular, preferably linear or matrix-shaped, arrangement of component coils. The RF receive coils of the respective radio-frequency antenna 4 also convert the alternating field emitted by the precessing nuclear spins, i.e., generally the nuclear spin echo signals caused by a pulse sequence consisting of one or more radio-frequency pulses and one or more gradient pulses, into a voltage (measurement signal) that is supplied via an amplifier 7 to a radio-frequency receive channel 8 of a radio-frequency system 22. The radio-frequency system 22, which is part of a control facility 10 of the magnetic resonance system 5, furthermore comprises a transmit channel 9 in which the radio-frequency pulses for excitation of the nuclear magnetic resonance are generated. Herein, the respective radio-frequency pulses are digitally represented as a sequence of complex numbers in the sequence controller 18 that is specified by the system computer 20. This sequence of numbers is supplied as a real and an imaginary part via an input 12 in each case to a digital-to-analog converter in the radio-frequency system 22 and from this to a transmit channel 9. In the transmit channel 9, the pulse sequences are modulated with a radio-frequency carrier signal with a base frequency corresponding to the resonance frequency of nuclear spins in the measurement volume.

The switch-over from transmit mode to receive mode takes place via a transmit/receive diplexer 6. The RF transmit coils of the radio-frequency antenna(s) 4 radiate the radio-frequency pulses for excitation of the nuclear spins into the measurement volume M and the resulting echo signals are sampled via the RF receive coil(s). The correspondingly obtained nuclear resonance signals are phase-sensitively demodulated to an intermediate frequency in the receive channel 8' (first demodulator) of the radio-frequency system 22, digitized in the analog-digital converter (ADC) and output via the output 11. This signal is then demodulated to the frequency 0. Demodulation to the frequency 0 and separation into real and imaginary parts takes place after digitization in the digital domain in a second demodulator 8. An MR image is reconstructed by an image computer 17 from the measurement data via an output 11. The administration of the measurement data, image data and the control programs takes place via the system computer 20. Based on a specification with control programs, the sequence controller 18 controls the generation of the pulse sequences desired in each case and the corresponding sampling of the k-space. In particular, herein, the sequence controller 18 controls the time accurate switching of the gradients, the transmission of the radio-frequency pulses with a defined phase amplitude and the reception of the nuclear resonance signals. The time base for the radio-frequency system 22 and the sequence controller 18 is provided by a synthesizer 19. The selection of corresponding control programs for acquiring MR data and for generating an MR image, which are, for example, stored on a DVD 21, and the depiction of the MR image generated takes place via a terminal 13 comprising a keyboard 15, a mouse 16 and a screen 14.

When acquiring MR data for an object O to be examined in the form of an implant wearer, it is necessary to observe implant-compliant limit values and so not every MR apparatus 5 can be used for this purpose. The implant-compliant limit values are, for example, specified by a standard, such as, for example, IEC 60601-2-33. This specifies an operating mode according to FPO:B which stipulates that certain limit values are to be observed, in particular for the values B1+peak, B1+rms, (|dB/dt|peak)FPO and (|dB/dt|rms)FPO. Peak values, such as, for example, B1+peak and/or (|dB/dt|peak)FPO, are preferably monitored permanently. RMS values, such as, for example, B1+rms and/or (|dB/dt|rms) FPO are preferably averaged over a first time interval, for example 10 seconds, and/or checked at the rate of a second time interval, for example 1 second. This is to ensure that a magnetic resonance examination does not pose any risk to patients wearing an implant according to FPO:B. In particular, the corresponding data and limit values for the respective implants are provided by a manufacturer so that a person entrusted with planning the MR scan can ensure the safety of the implant wearer. To date, the corresponding data has been compiled based on extensive Internet research, wherein it is not always ensured that the data researched in this way is trustworthy and up-to-date. For this purpose, one or more example embodiments of the present invention propose the method for storing MR implant information data as shown schematically in FIG. 2 in the form of a flow diagram.

To check observance of implant-compliant limit values, the MR apparatus 5 comprises a safeguarding unit, wherein the safeguarding unit provides safety measurement data during the examination, such as, for example, data on broadband and/or narrowband radio-frequency excitation signals of the radio-frequency antenna unit and/or data on gradient currents of the gradient coil system. Preferably, this data is at least partially verified to ensure that the data has been correctly acquired and transmitted. Various mechanisms are conceivable for this, such as, for example, a redundant measurement data stream, which is checked permanently or cyclically against one another, in particular depending on the risk of failure and/or falsification.

Should it be established that one or more implant-compliant limit values have been exceeded, the safeguarding unit initiates a safe shutdown of the MR apparatus 5.

Figure 2:
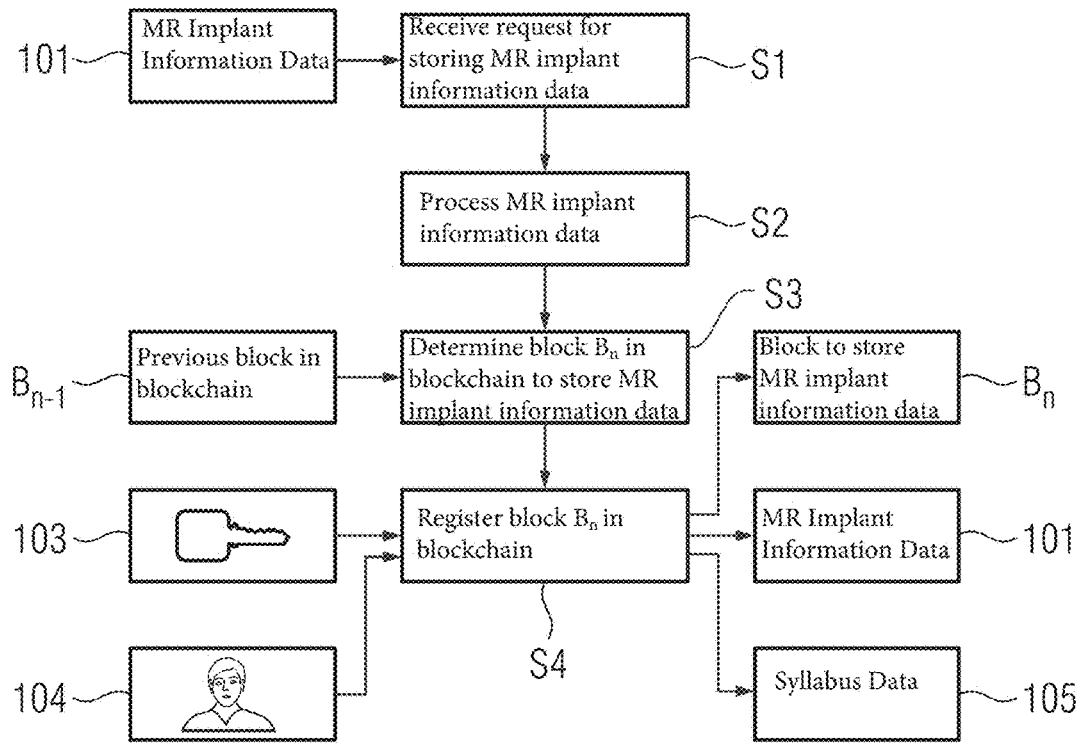
FIG. 2 a flow diagram of a method for storing MR implant information data, according to an embodiment of the present invention.

FIG. 2 is a flow diagram of an embodiment of the method for storing MR implant information data 101, according to an embodiment of the present invention. In a method step S1, a request for storing MR implant information data 101 is received. The request is, for example, made by an implant manufacturer. The request relates to the MR implant information data 101, wherein the MR implant information data 101 in turn relates to an implant. For example, the MR implant information data 101 comprises details of a product data sheet, characteristics and/or MR-relevant information for the respective implant. The request is for the purpose of storing the MR implant information data 101, wherein the storage should be tamper-proof. In other words, the MR implant information data 101 to be stored is to be stored in such a way that such stored data cannot be subsequently modified without this being noticed. The stored MR implant information data is particularly trustworthy, up-to-date and safe. In this way, the implant manufacturer can ensure that users who rely on secure data can consider the stored MR implant information data 101 to be trustworthy, safe and up-to-date. In order to be able to ensure that only relevant and/or trustworthy data is stored, it can be provided that the request has to originate from a restricted user group, wherein the method does not further process or store requests 100 that do not originate from the restricted user group. The restricted user group comprises, for example, implant manufacturers, hospitals, medical practices, examination centers, manufacturers of medical devices and/or medical physicists.

MR implant information data 101 can be received and/or stored for a wide variety of implants, for example pacemakers, implanted pumps for applying drugs and/or implanted sensors for monitoring a measured variable. It is particularly preferable that the MR implant information data 101 has a uniform format or uniform data structure, for example that the MR implant information data 101 must be provided in this format or this structure for storage. The MR implant information data 101 in particular comprises variables, parameters, settings and/or limit values to be observed during an MR scan of an implant wearer with the associated implant.

In a method step S2, the MR implant information data 101 to be stored is further processed, wherein, based on the MR implant information data 101, specifically based on the content of the MR implant information data 101, a hash is determined and/or calculated. The hash is in particular a hash value. For example, a hash function is applied to the MR implant information data 101 or the content thereof. The hash is in particular determined in such a way that an alteration to the MR implant information data 101 or an alteration to the content thereof results in a different hash. In other words, alterations to the MR implant information data 101 result in a change to the hash.

In a method step S3, a block Bn in a blockchain is determined for the MR implant information data 101 to be stored. The block Bn is determined based on the hash of the MR implant information data 101 and a reference to a previous block Bn−1 in the blockchain. In particular, the previous and/or future blocks Bx in the blockchain in each case have a reference to a previous block Bx−1.

In a method step S4, the generated block Bn is registered in the blockchain and thus itself becomes part of the blockchain. Since, after registration in the blockchain, the block Bn itself is a reference for further blocks, a subsequent alteration of the MR implant information data 101 is not possible without this being noticed. This procedure enables tampering with MR implant information data 101 to be identified since it would result in altered hashes and thus to alteration of the blocks. The MR implant information data 101 is stored in a memory. The memory can, for example, be a cloud-based memory. Specifically, a central memory can be provided, wherein, based on the registered blocks in the blockchain, decentralized storage can also be applied, in particular on a memory with a low degree of tamper-proofing. If the stored MR implant information data 101 is to be protected more strongly against unauthorized access or use, the MR implant information data 101 can be encrypted before being stored in the memory. A corresponding key 103 can be obtained or received for this purpose. Further, it can be provided that the MR implant information data 101 to be stored is provided with a user identity 104 or already comprises the user identity 104. Specifically, the user identity 104 is provided by the respective user, in particular the user who made the request. The key 103 can in particular be a key 103 associated with the user identity 104. For example, in this way, MR implant information data 101 obtained from or provided by the memory can be verified based on the user identity 104 and/or decrypted based on the key 103, wherein the key 104 can, for example, be obtained from a person associated with the user identity 104.

In one of method steps S1, S2, S3, S4, syllabus data 105 can be generated and/or determined. In this exemplary embodiment, the syllabus data 105 is generated and/or determined in method step S4. The syllabus data 105 is, for example, a summary of the MR implant information data 101, in particular a summary with respect to MR-relevant variables, parameters and/or limit values. Preferably, the syllabus data 105 has a uniform structure and/or format, for example the data comprised by the syllabus data 105 is arranged or tabulated based on a prespecified and/or pre-specifiable order.

Figure 3:
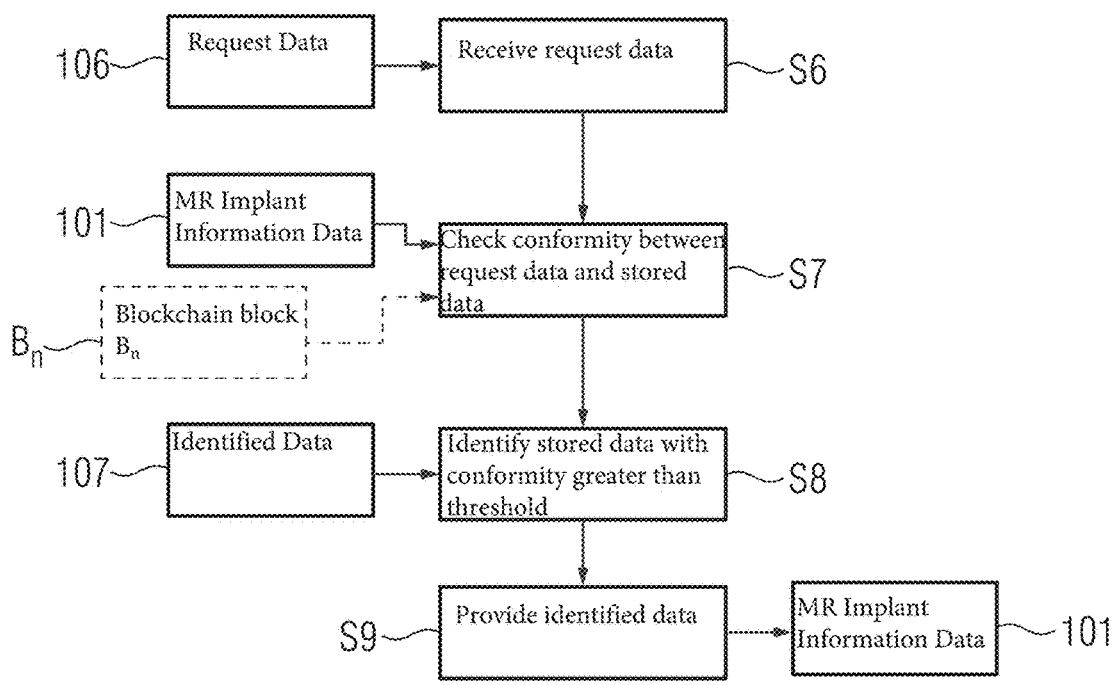
FIG. 3 a flow diagram of a method for identifying MR implant information data.

FIG. 3 shows a flowchart of an embodiment of the method in which stored MR implant information data 101 is to be identified based on request data 106. This embodiment of the method is based on and/or uses stored MR implant information data 101, wherein the MR implant information data 101 is stored based on the method according to an embodiment of the present invention or as described for FIG. 2.

In a method step S6, request data 106 is received. Method step 106 is preferably preceded by method steps S1 to S6. This embodiment of the method is in particular used to determine the associated MR implant information data 101 for an implant and/or an implant wearer based on the request data 106. The request data 106 comprises, for example, data and/or information that is relevant and/or characteristic of the implant or the implant wearer. The request data 106 can comprise an ID of the implant, a serial number of the implant, a product name of the implant, details of the manufacturer of the implant and/or further information about the implant wearer's implant that enables the implant to be uniquely assigned to MR implant information data 101.

In a method step S7, conformity between the request data 106 and the stored MR implant information data 101 is checked. For this purpose, the stored MR implant information data 101 registered in the blockchain is accepted and/or retrieved. Specifically, here, a check is performed based on the blocks B in the blockchain as to whether the accepted MR implant information data 101 has been altered or is trustworthy. Conformity is checked using a measure of conformity. The measure of conformity is for example a variable indicating the degree of conformity between two objects, in particular two data sets. To check conformity, in method step S7, a measure of conformity is determined for different combinations, specifically all combinations, of request data 106 with MR implant information data 101.

In a method step S8, MR implant information data 101 with a measure of conformity greater than a threshold value 107 is identified. The threshold value 107 can be a prespecified value, in particular a fixed value, or an adjustable value provided and/or set by the user. For MR implant information data 101 with a measure of conformity greater than the threshold value 107, conformity between the request data 106 and the MR implant information data 101 is assumed. The MR implant information data 101 identified in this way can be understood as the result, in particular the search result, of the request with the request data 106.

In a method step S9, the identified MR implant information data 101 is provided and/or output, in particular the identified MR implant information data 101 is provided to the requesting user. For example, identified MR implant information data 101 is provided and/or output via a display, wherein the MR implant information data 101 is displayed visually. Alternatively and/or supplementarily, the identified MR implant information data 101 is provided by providing the MR implant information data 101 as a file and/or download.

Figure 4:
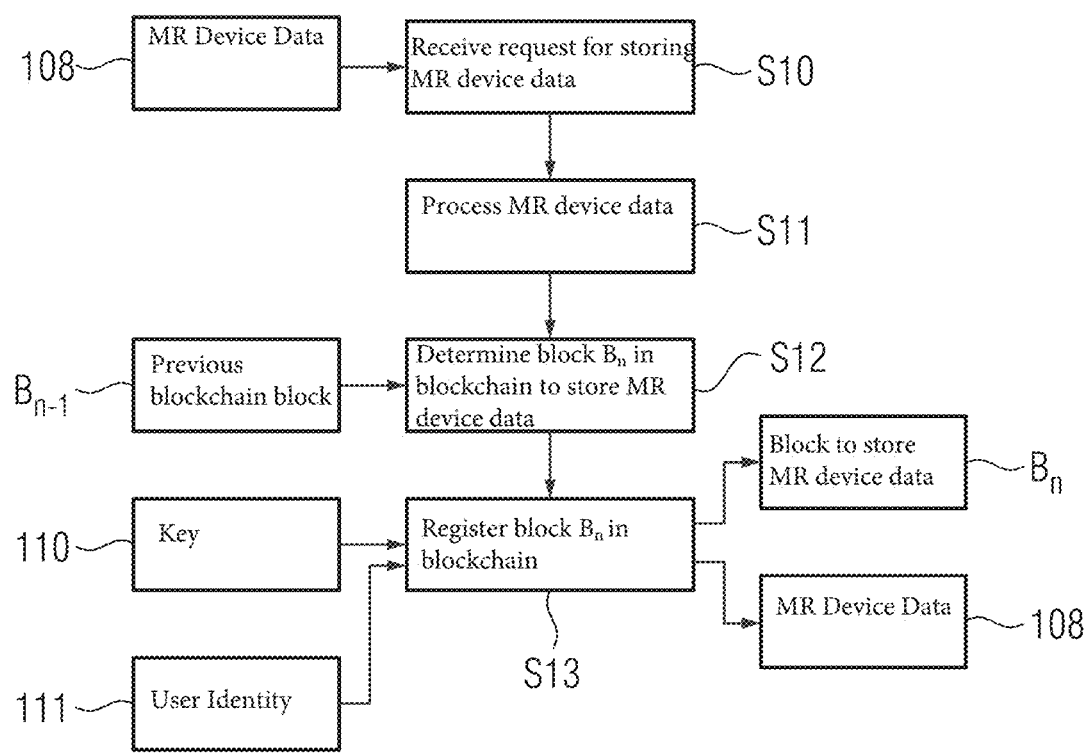
FIG. 4 a flow diagram of a method for storing MR device data, according to an embodiment of the present invention.

FIG. 4 is a flow diagram of an embodiment of the method for storing MR device data 108, according to an embodiment of the present invention. In a method step S10, a request for storing MR device data 108 is received. The request 108 is, for example, issued by a manufacturer of MR apparatuses 5. The request explicitly relates to the storage of specific MR device data 108, wherein the MR device data 108 in turn relates to a specific MR apparatus 5, a specific type, a specific product series and/or a manufacturer of MR apparatuses 5. For example, the MR device data 108 comprises the details of a product data sheet for the MR apparatus, specifically operating parameters, characteristics and/or adjustable parameters for the MR apparatus 5. The request serves the purpose of storing the MR device data 108, wherein the storage is to be tamper-proof. In other words, the MR device data 108 to be stored is to be stored in such a way that data stored in this way cannot be subsequently modified without this being noticed. MR device data 108 stored in this way is particularly trustworthy, up-to-date and safe. In this way, the manufacturer of MR apparatuses 5 can ensure that users who rely on secure data can consider the stored MR device data 101 to be correspondingly trustworthy, safe and up-to-date. In order to be able to ensure that only relevant and/or trustworthy data is stored, it can be provided that the request has to originate from a restricted user group, wherein the method does not further process or store requests that do not originate from the restricted user group. The restricted user group comprises, for example, manufacturers of MR apparatuses 5, operators of MR apparatuses 5, hospitals, medical practices, examination centers and/or medical physicists.

MR device data 108 can be received and/or stored for different MR apparatuses 5, for example for different manufacturers, product lines, models and/or embodiments of MR apparatuses 5. It is particularly preferable that the MR device data 108 has a uniform format or a uniform data structure. Preferably, the MR device data 108 is to be provided for storage in this format or data structure. The MR device data 108 in particular comprises variables, parameters, settings and/or limit values that are relevant or to be taken into account for an MR scan of an implant wearer.

In a method step S11, the MR device data 108 to be stored is further processed, wherein, based on the MR device data 108, specifically based on the content of the MR device data 108, a hash is determined. The hash is in particular a hash value. For example, a hash function is applied to the MR device data 108 or the content thereof. The hash is in particular determined in such a way that an alteration to the MR device data 108 or an alteration to the content thereof results in a different hash. In other words, alterations to the MR device data 108 result in a change to the hash.

In a method step S12, a block Bn in a blockchain is determined for the MR device data 108 to be stored. The block Bn is determined based on the hash of the MR device data 108 and a reference to a previous block Bn–1 in the blockchain. In particular, the previous and/or the future blocks Bx in the blockchain have a reference to a previous block Bx–1.

In a method step S13, the generated block Bn is registered in the blockchain and thus itself becomes part of the blockchain. Since, after registration in the blockchain, the block itself is a reference for further blocks, subsequent alteration of the MR device data 108 is not possible without this being noticed. This procedure enables tampering with MR device data 108 to be identified since it would result in altered hashes and thus to alteration of the blocks. The MR device data 108 is stored in a memory. The memory can, for example, be a cloud-based memory. Specifically, a central memory can be provided, wherein, based on the registered blocks in the blockchain, decentralized storage can also be provided, in particular on a memory with a low degree of tamper-proofing. If the stored MR device data 108 is to be protected more strongly against unauthorized access or use, the MR device data 108 can be encrypted before being stored in the memory. A corresponding key 110 can be obtained or received for this purpose. Further, it can be provided that the MR device data 108 to be stored is provided with a user identity 111 or already comprises the user identity 111. Specifically, the user identity 111 is provided by the respective user, in particular the user who made the request. The key 110 can in particular be a key 110 associated with the user identity 111. For example, in this way, MR device data 108 obtained from or provided by the memory can be verified based on the user identity 111 or decrypted and/or based on the key 112.

Figure 5:
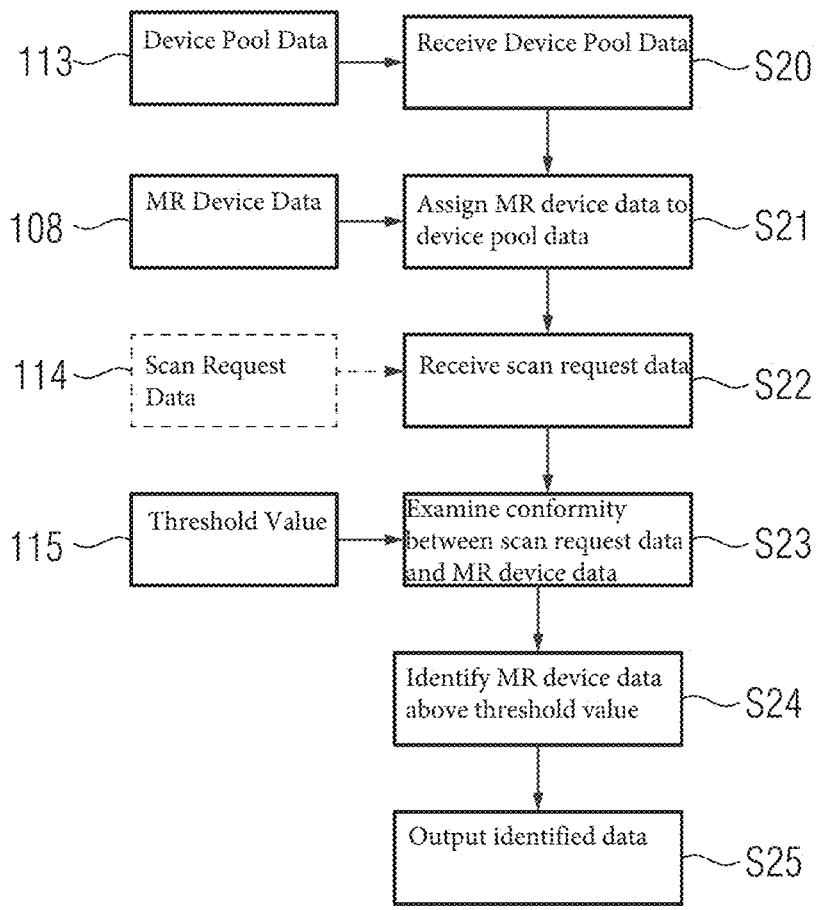
FIG. 5 a flow diagram of a method for identifying MR device data.

FIG. 5 shows an exemplary sequence for identifying an MR apparatus 5 from a device pool that is suitable for an MR scan of an implant wearer. A device pool should be understood to be a set of MR apparatuses 5 available for MR scans by an operator or user of the device pool. The MR apparatuses 5 comprised by the device pool can be located within an organization, for example a hospital or examination center, or can be distributed across a plurality of organizations or locations. Device pool data 113 can be determined for the device pool, wherein the device pool data 113 information and/or details about the MR apparatuses 5 in the device pool. For example, the device pool data 113 comprises IDs, type details, product line details and/or serial numbers of the MR apparatuses 5.

The device pool data 113 is received in method step S20. For example, the device pool operator provides the device pool data 113 in step S20. In method step S21, MR device data 108 is assigned to the device pool data 113. Here, the MR device data 108 associated with the MR apparatuses 5 of the device pool are assigned to the device pool data 113. This takes place, for example, based on the information and details of the MR apparatuses 5, in particular the IDs, type details, product line details and/or serial numbers. In this way, the assignment of device pool data 113 and MR device data 108 forms a subset comprising the MR device data of the device pool.

Figure 6:
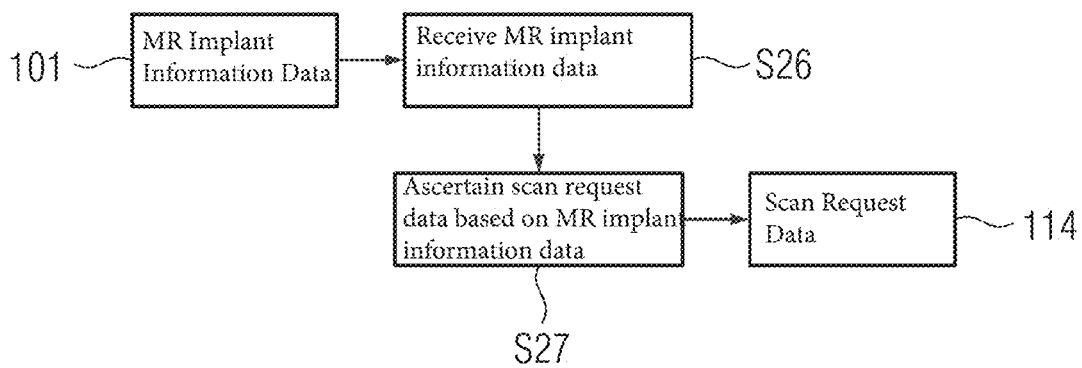
FIG. 6 a flow diagram of a method for ascertaining scan request data.

In a method step S22, scan request data 114 is received. Alternatively and/or supplementarily to receiving the scan request data 114, the scan request data 114 can, for example, be ascertained based on MR implant information data 101 (FIG. 6). The scan request data 114 relates to an object under examination, in particular an implant of an implant wearer. The scan request data 114 comprises information and/or details relating to an implant, in particular variables, limit values and/or parameters to be observed for an MR scan of the implant or the implant wearer.

In a method step S23, conformity between the scan request data 114 and the MR device data 108 of the device pool is examined. For this purpose, the stored MR device data 108 registered in the blockchain of the device pool is accepted and/or retrieved. Specifically, here, a check is also performed based on the blocks B in the blockchain as to whether the accepted MR device data 108 has been altered or is trustworthy. Conformity is checked using a measure of conformity. The measure of conformity is a variable indicating the degree of conformity between two objects, in particular data sets. In particular, the measure of conformity describes how well the conditions, values and/or limit values for an MR scan comprised in the scan request data 114 are observed by the MR apparatuses 5, in particular whether the conditions, values and/or limit values are met by the MR device data. To check conformity, a measure of conformity is in each case determined for different combinations, specifically for all combinations, of scan request data 114 and MR device data 108.

In a method step S24, MR device data 108 with a measure of conformity greater than a threshold value 115 is identified. The threshold value 115 can be a prespecified value, in particular a fixed value, or an adjustable value provided and/or set by the user. For MR device data 108 with a measure of conformity greater than the threshold value 114, it is assumed that the MR apparatus 5 associated with the MR device data 108 has conformity with and/or satisfies the scan request data 106. The MR device data 108 identified in this way can be understood as the result, in particular the search result, of the request. The identified MR device data 108, specifically details of the associated MR apparatus 5, is provided and/or output in a method step S25. For example, it is provided and/or output via a display.

FIG. 6 shows an exemplary sequence for ascertaining the scan request data 114 based on MR implant information data 101. This sequence, or method, can be implemented in step S22 of the method sequence in FIG. 5.

In a method step S26, MR implant information data 101 is received. The MR implant information data 101 relates to an implant in an object under examination, in particular an implant in an implant wearer. The received MR implant information data 101 is in particular MR implant information data 101 stored in the memory and based on the blockchain. For example, the received MR implant information data 101 is MR implant information data 101 identified based on the request data.

In method step S27, the scan request data 114 is ascertained based on the MR implant information data 101. For this purpose, the information, data and/or details relevant for an MR scan of the implant or the object under examination and/or implant wearer with the implant are extracted from the MR implant information data 101. For example, for this purpose, the limit values and/or permissible parameters to be observed by the MR apparatuses 5 authorized and/or suitable for the MR scan are extracted from the MR implant information data 101. The scan request data 114 ascertained in this way is provided, in particular provided to method step S23.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/ or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Although the present invention has been shown and described with respect to certain example embodiments, equivalents and modifications will occur to others skilled in the art upon the reading and understanding of the specification. The present invention includes all such equivalents and modifications and is limited only by the scope of the appended claims.

What is claimed is:

1. A method for storing magnetic resonance (MR) implant information data, the method comprising:
   receiving MR implant information data for an implant;
   determining syllabus data based on the MR implant information data, wherein the syllabus data is a summary of the MR implant information data;
   determining a hash for the MR implant information data;
   generating a block for a blockchain, wherein the block includes the hash and a reference to a previous block in the blockchain;
   storing the MR implant information data and the syllabus data in a memory; and
   registering the block in the blockchain.

2. The method as claimed in claim 1, further comprising:
   encrypting the MR implant information data, wherein the MR implant information data is stored in the memory as encrypted MR implant information data.

3. The method as claimed in claim 2, further comprising:
   receiving request data relating to an implant;
   ascertaining a measure of conformity with respect to a conformity of the request data at least one of with the MR implant information data or with syllabus data that is based on the MR implant information data;
   identifying, in response to the measure of conformity being greater than a threshold value, MR implant information data associated with at least one of the measure of conformity or the syllabus data; and
   providing at least one of the identified MR implant information data or the syllabus data.

4. The method as claimed in claim 2, wherein the MR implant information data includes at least one of an RMS magnetic field permissible for an MR scan of the implant, a permissible maximum magnetic field or a permissible temporal change in a magnetic field.

5. The method as claimed in claim 1, further comprising:
   receiving request data relating to an implant;
   ascertaining a measure of conformity with respect to a conformity of the request data at least one of with the MR implant information data or with the syllabus data that is based on the MR implant information data;
   identifying, in response to the measure of conformity being greater than a threshold value, MR implant information data associated with at least one of the measure of conformity or the syllabus data; and
   providing at least one of the identified MR implant information data or the syllabus data.

6. The method as claimed in claim 5, wherein the MR implant information data includes at least one of an RMS magnetic field permissible for an MR scan of the implant, a permissible maximum magnetic field or a permissible temporal change in a magnetic field.

7. The method as claimed in claim 1, wherein the MR implant information data includes at least one of an RMS magnetic field permissible for an MR scan of the implant, a permissible maximum magnetic field or a permissible temporal change in a magnetic field.

8. A system for storing MR implant information data with a plurality of interconnected apparatuses, each of the plurality of interconnected apparatuses including a processor, a non-volatile memory, instructions on the non-volatile memory for controlling the processor and a client application, wherein, for each of the plurality of interconnected apparatuses, the client application is configured to cause the interconnected apparatus to perform the method as claimed in claim 1.

9. A non-transitory computer-readable storage medium storing computer-readable instructions that, when executed by a computer, cause the computer to perform the method as claimed in claim 1.

10. The method as claimed in claim 2, further comprising:
    determining syllabus data based on the MR implant information data, wherein the syllabus data is a summary of the MR implant information data; and
    storing the syllabus data in the memory.

11. A method for storing MR device data, the method comprising:
    receiving MR device data for an MR apparatus, the MR device data for the MR apparatus including at least one of adjustable parameters or parameter ranges;
    determining a hash for the MR device data;
    generating a block for a blockchain, wherein the block includes the hash and a reference to a previous block in the blockchain;
    storing the MR device data in a memory; and
    registering the block in the blockchain.

12. The method as claimed in claim 11, further comprising:
    receiving device pool data for a device pool, wherein the device pool data includes information about MR apparatuses at least one of present or available in the device pool;

for the MR apparatuses at least one of present or available in the device pool, assigning MR device data to the device pool data;

receiving or ascertaining scan request data for an object under examination, wherein the scan request data includes at least one scan parameter, the at least one scan parameter being at least one of a parameter or a limit value to be observed for an MR scan of the object under examination;

ascertaining a measure of conformity with respect to a conformity of the scan request data with the assigned MR device data of the device pool data;

identifying, in response to the measure of conformity being greater than a threshold value, a MR device data associated with the measure of conformity; and providing the identified MR device data.

13. The method as claimed in claim 12, further comprising:

receiving MR implant information data for an implant of the object under examination, wherein the MR implant information data is stored in a memory based on a blockchain; and ascertaining the scan request data based on the received MR implant information data, wherein to ascertain the scan request data, at least one of limit values to be observed or permissible parameters for an MR scan are extracted from the MR implant information data for an MR scan of the implant.

14. A system for storing MR device data with a plurality of interconnected apparatuses, each of the plurality of interconnected apparatuses including a processor, a non-volatile memory, instructions on the non-volatile memory for controlling the processor and a client application, wherein, for each of the plurality of interconnected apparatus, the client application is configured to cause the interconnected apparatus to perform the method as claimed in claim 11.

15. A non-transitory computer-readable storage medium storing computer-executable instructions that, when executed at a computer, cause the computer to perform the method of claim 11.

* * * * *